United States Patent
Koseoglu et al.

(10) Patent No.: US 11,098,256 B2
(45) Date of Patent: Aug. 24, 2021

(54) MODIFIED ULTRA-STABLE Y (USY) ZEOLITE CATALYST FOR IMPROVING COLD FLOW PROPERTIES OF DISTILLATES

(71) Applicants: Saudi Arabian Oil Company, Dhahran (SA); JGC Catalysts and Chemicals Ltd., Kawasaki Kanagawa (JP); Japan Cooperation Center, Petroleum, Tokyo (JP)

(72) Inventors: Omer Refa Koseoglu, Dhahran (SA); Mitsunori Watabe, Kawasaki (JP); Tomoyasu Kagawa, Kawasaki (JP); Koji Uchida, Kawasaki (JP)

(73) Assignees: Saudi Arabian Oil Company, Dhahran (SA); JGC Catalysts and Chemicals Ltd., Kawasaki Kanagawa (JP); Japan Cooperation Center, Petroleum, Tokyo (JP)

(*) Notice: Subject to any disclaimer, the term of this patent is extended or adjusted under 35 U.S.C. 154(b) by 0 days.

(21) Appl. No.: 16/737,281

(22) Filed: Jan. 8, 2020

(65) Prior Publication Data
US 2021/0207042 A1    Jul. 8, 2021

(51) Int. Cl.
*C10G 45/64* (2006.01)
*B01J 29/08* (2006.01)

(52) U.S. Cl.
CPC ............ *C10G 45/64* (2013.01); *B01J 29/088* (2013.01); *B01J 2229/183* (2013.01);
(Continued)

(58) Field of Classification Search
CPC ............ C10G 45/64; C10G 2300/1048; C10G 2300/304; C10G 2300/4006;
(Continued)

(56) References Cited

U.S. PATENT DOCUMENTS 4,191,635 A * 3/1980 Quick .................. B01J 23/28
                                           208/211
4,918,225 A    4/1990 Rittner et al.
(Continued)

FOREIGN PATENT DOCUMENTS

JP    6001531 B2    10/2016
JP    6042328 B2    12/2016
(Continued)

OTHER PUBLICATIONS

Wang, Yandan, et al. "Influence of Zirconium Modified USY on Coupled Hydrogenation and Ring Opening of Tetralin Over NiW/USY+ Al 2 O 3." Catalysis Letters 147.7 (2017): 1704-1713.
(Continued)

*Primary Examiner* — Brian A McCaig
(74) *Attorney, Agent, or Firm* — Leason Ellis LLP

(57) ABSTRACT

A process is provided for improving cold flow properties of distillates, the process comprises the step of contacting a hydrocarbon feedstock with a framework-substituted ultra-stable Y (USY)-type zeolite in which a portion of aluminum atoms constituting a zeolite framework thereof is substituted with zirconium atoms and/or titanium and/or hafnium atoms, thereby producing a dewaxed distillate product.

22 Claims, 2 Drawing Sheets

(52) U.S. Cl.
CPC ... *B01J 2229/26* (2013.01); *C10G 2300/1048* (2013.01); *C10G 2300/304* (2013.01); *C10G 2300/4006* (2013.01); *C10G 2300/4012* (2013.01); *C10G 2300/4018* (2013.01)

(58) Field of Classification Search
CPC ..... C10G 2300/4012; C10G 2300/4018; B01J 29/088; B01J 2229/26; B01J 2229/183
See application file for complete search history.

(56) References Cited

U.S. PATENT DOCUMENTS

| | | | |
|---|---|---|---|
| 5,310,477 A | 5/1994 | Lomas | |
| 6,103,948 A | 8/2000 | Ginosar et al. | |
| 6,855,856 B2 | 2/2005 | Van Broekhoven et al. | |
| 6,884,339 B2 | 4/2005 | Benazzi et al. | |
| 7,550,405 B2 | 6/2009 | Shan et al. | |
| 7,592,282 B2 | 9/2009 | Ginosar et al. | |
| 7,750,197 B2 | 7/2010 | Van Broekhoven et al. | |
| 7,858,069 B2 | 12/2010 | Ginosar et al. | |
| 8,163,969 B2 | 4/2012 | Van Broekhoven et al. | |
| 8,395,006 B2 | 3/2013 | Clark et al. | |
| 8,574,542 B2 | 11/2013 | Domokos et al. | |
| 8,937,205 B2 | 1/2015 | Iaccino et al. | |
| 9,012,696 B2 | 4/2015 | Calaresu et al. | |
| 9,145,522 B2 | 9/2015 | Negiz et al. | |
| 9,150,494 B2 | 10/2015 | Tonkovich et al. | |
| 9,238,599 B2 | 1/2016 | Winsett | |
| 9,376,325 B2 | 6/2016 | Domokos et al. | |
| 10,071,939 B2 | 9/2018 | Abudawoud et al. | |
| 10,173,950 B2 | 1/2019 | Abudawoud et al. | |
| 10,293,332 B2 | 5/2019 | Koseoglu et al. | |
| 10,427,143 B2 | 10/2019 | Domokos et al. | |
| 2003/0168379 A1 | 9/2003 | Degnan et al. | |
| 2004/0162454 A1 | 8/2004 | Gao et al. | |
| 2006/0020154 A1 | 1/2006 | Lo et al. | |
| 2010/0305373 A1 | 12/2010 | Berna et al. | |
| 2011/0219671 A1 | 9/2011 | Hanks et al. | |
| 2013/0175202 A1* | 7/2013 | Koseoglu | B01J 35/1019 208/111.1 |
| 2014/0190868 A1 | 7/2014 | Koseoglu et al. | |
| 2014/0262956 A1* | 9/2014 | Duma | B01J 27/14 208/253 |
| 2019/0022630 A1 | 1/2019 | Koseoglu et al. | |
| 2019/0194095 A1 | 6/2019 | Xu et al. | |

FOREIGN PATENT DOCUMENTS

| | | |
|---|---|---|
| WO | 2017112558 A1 | 6/2017 |
| WO | 2019147345 A1 | 8/2019 |

OTHER PUBLICATIONS

Juarez, Raquel, et al. "Transition metal containing zeolites and mesoporous MCM-41 as heterogeneous catalysts for the N-alkylation of 2, 4-diaminotoluene with dimethylcarbonate." Catalysis Communications 10.5 (2009): 472-476.

International Search Report and Written Opinion in Corresponding PCT Application No. PCT/US2021/012268 dated Apr. 8, 2021. 11 pages.

International Search Report and Written Opinion in Corresponding PCT Application No. PCT/US2020/064836 dated Mar. 19, 2021. 9 pages.

* cited by examiner

MODIFIED ULTRA-STABLE Y (USY) ZEOLITE CATALYST FOR IMPROVING COLD FLOW PROPERTIES OF DISTILLATES

TECHNICAL FIELD

The present disclosure relates to a process for improving cold flow properties of distillates using zirconium and/or titanium and/or hafnium modified ultra-stable Y (USY) type zeolite catalysts.

BACKGROUND

The discharge into the atmosphere of sulfur compounds during processing and end-use of the petroleum products derived from sulfur-containing sour crude oil poses health and environmental problems. Stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In the industrialized nations such as the United States, Japan and the countries of the European Union, refineries have already been required to produce environmentally clean transportation fuels. For instance, in 2007, the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the footsteps of the United States and the European Union and are moving forward with regulations that will require refineries to produce transportation fuels with ultra-low sulfur levels.

To keep pace with recent trends toward production of ultra-low sulfur fuels, refiners must choose among the processes or crude oils that provide flexibility that ensures future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, represent a substantial prior investment and were constructed before these more stringent sulfur reduction requirements were enacted. It is very difficult to upgrade existing hydrotreating reactors in these facilities because of the comparatively more severe operational requirements (i.e., higher temperature and pressure) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3000 ppmw sulfur. These units were designed for, and are being operated at, relatively mild conditions (i.e., low hydrogen partial pressures of 30 kilograms per square centimeter for straight run gas oils boiling in the range of from 180° C. to 370° C.).

With the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by incorporating gas purification systems, reengineering the internal configuration and components of reactors, and/or deployment of more active catalyst compositions.

Sulfur-containing compounds that are typically present in hydrocarbon fuels include aliphatic molecules such as sulfides, disulfides and mercaptans as well as aromatic molecules such as thiophene, benzothiophene and its long chain alkylated derivatives, and dibenzothiophene and its alkyl derivatives such as 4,6-dimethyl-dibenzothiophene.

Aliphatic sulfur-containing compounds are more easily desulfurized (labile) using mild hydrodesulfurization methods. However, certain highly branched aromatic molecules can sterically hinder the sulfur atom removal and are moderately more difficult to desulfurize (refractory) using mild hydrodesulfurization methods.

Among the sulfur-containing aromatic compounds, thiophenes and benzothiophenes are relatively easy to hydrodesulfurize. The addition of alkyl groups to the ring compounds increases the difficulty of hydrodesulfurization. Dibenzothiophenes resulting from addition of another ring to the benzothiophene family are even more difficult to desulfurize, and the difficulty varies greatly according to their alkyl substitution, with di-beta substitution being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level is very costly by current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

The relative reactivity of thiols and sulfides are much higher than those of aromatic sulfur compounds and sulfides are much more reactive than the aromatic sulfur compounds. It should be noted that non-thiophenic sulfides such as paraffinic and/or naphthenic are present in diesel range hydrocarbons as can be seen from the relative reactivity chart shown in FIG. 1.

Studies have been conducted related to increasing the relative reactivity of sterically hindered sulfur-containing hydrocarbons. In particular, isomerization of 4,6-dimethyl-dibenzothiophene into methyl-migrated isomers and tri- or tetramethyl-dibenzothiophenes has been studied. However, none of the above-mentioned references describe processes for desulfurization of including specific sub-processes and apparatus for targeting different organosulfur compounds. With the steady increase in demand for hydrocarbon fuels having an ultra-low sulfur level, a need exists for an efficient and effective process and apparatus for desulfurization.

Cold Flow Properties

Cold flow properties indicate the low-temperature operation ability of any fuel and are determined using the following standard tests: cloud, cold filter plugging and pour points. Cloud point, which is determine by ASTM D 2500 method, is to the temperature below which wax in diesel forms a cloudy appearance. The pour point of a liquid is the temperature below which the liquid loses its flow characteristics. Pour point, which is determined by ASTM D97 method, is generally associated with a high paraffin content. Cold filter plugging point (CFPP), which is determined by ASTM D6371 method, is the lowest temperature at which a given volume of diesel type of fuel still passes through a standardized filtration device in a specified time when cooled under certain conditions.

A summary of cold flow properties for various gas oils boiling in the range 180-370° C. are given in Table 1. As seen, the cold flow properties of gas oils vary from region to region and it is a function of the gas oil composition.

TABLE 1

| Property | ME1 | ME2 | ME3 | ME4 | ME5 | AF | NS | RF | SA |
|---|---|---|---|---|---|---|---|---|---|
| Pour Point, ° C. | −9 | −16 | −14 | −15 | −18 | −18 | −9 | −12 | −45 |
| Cloud Point, ° C. | −10 | −13 | −11 | −13 | −11 | −12 | −8 | −10 | −35 |

ME: Middle East;
AF: Africa;
NS: North Sea;
RF: Russian Federation;
SA: South American A survey of worldwide cold flow properties of diesel fuel is published by Infineum and is reproduced in Table 2 as a reference. As seen and expected, the cold flow properties of diesel fuels is related to the climate in each country. For example, Saudi Arabia, a warm country, has high cold flow properties whilst Canada, a cold country, has the lowest cold flow properties.

TABLE 2

| Country | Cloud Point, ° C. | CFPP, ° C. | Pour Point, ° C. |
|---|---|---|---|
| Average | −8 | −18 | −21 |
| Min | −33 | −41 | −45 |
| Max | 10 | 7 | 5 |
| Austria | −12 | −28 | −29 |
| Belarus | −8 | −30 | −30 |
| Benelux | −7 | −27 | −33 |
| Croatia | −6 | −19 | −27 |
| Czech | −8 | −24 | −27 |
| Denmark | −10 | −23 | −33 |
| Finland | −28 | −41 | −38 |
| France | −7 | −22 | −28 |
| Germany | −9 | −28 | −29 |
| Greece | −3 | −17 | −18 |
| Hungary | −11 | −29 | −27 |
| Ireland | −6 | −17 | −24 |
| Italy | −5 | −17 | −25 |
| Lithuania | −19 | −35 | −32 |
| Norway | −25 | −37 | −45 |
| Poland | −12 | −29 | −32 |
| Portugal | −4 | −10 | −14 |
| Romania | −12 | −27 | −32 |
| Slovakia | −6 | −31 | −33 |
| Spain | −4 | −16 | −18 |
| Sweden | −31 | −35 | −35 |
| Switzerland | −13 | −30 | −28 |
| Turkey | −4 | −18 | −24 |
| United Kingdom | −7 | −19 | −24 |
| Ukraine | −14 | −32 | −30 |
| Australia | −3 | −7 | −8 |
| China | −12 | −14 | −21 |
| India | −2 | −3 | −6 |
| Indonesia | 5 | 2 | −1 |
| Japan G2 | −6 | −12 | −20 |

TABLE 2-continued

| Country | Cloud Point, ° C. | CFPP, ° C. | Pour Point, ° C. |
|---|---|---|---|
| Japan G3 | −12 | −16 | −25 |
| Japan SP G3 | −18 | −36 | −40 |
| Malaysia | 10 | 7 | 5 |
| New Zealand | −4 | −10 | −17 |
| Singapore | 5 | 3 | −2 |
| South Korea | −11 | −29 | −31 |
| Thailand | 9 | 5 | 3 |
| Argentina | −2 | −14 | −13 |
| Brazil | −2 | −7 | −12 |
| Canada | −33 | −34 | −45 |
| Chile | −5 | −8 | −12 |
| Colombia | −9 | −14 | −12 |
| Peru | −16 | −21 | −23 |
| USA East | −13 | −19 | −25 |
| USA Mid-West | −17 | −22 | −30 |
| USA-West | −12 | −13 | −21 |
| Bahrain | −2 | −3 | −9 |
| Israel | −2 | −8 | −12 |
| Kuwait | 2 | 1 | 0 |
| Oman | −5 | −7 | −11 |
| Qatar | −5 | −8 | −8 |
| Saudi Arabia | −4 | −8 | −12 |
| UAE | −3 | −7 | −7 |
| South Africa | −9 | −14 | −15 |

It is known that a typical hydrodesulfurization process and/or catalyst only removes sulfur from molecules with no or little improvement on other properties of the diesel fuel. Paraffinic diesel fuels must be dewaxed to improve the cold flow properties.

The process disclosed herein addresses and overcomes these deficiencies.

SUMMARY

The present disclosure provides a process to hydrodesulfurize and dewax distillates to improve cold flow properties, e.g., cloud point, pour point, using zirconium and/or titanium and/or hafnium modified ultra-stable Y (USY) type zeolite catalysts.

More specifically, the zirconium and/or titanium and/or hafnium modified ultra-stable Y (USY) type zeolite catalysts can be used to hydrotreat and hydrodewax a hydrocarbon oil.

In some embodiments, the framework-substituted ultra-stable Y (USY)-type zeolite is one wherein a portion of aluminum atoms constituting a zeolite framework thereof is substituted with zirconium atoms and/or titanium atoms and/or hafnium atoms.

In one aspect of the present disclosure, a process for making a diesel fuel product, comprises the steps of:

contacting a feedstock with a hydrotreating catalyst under effective hydrotreating conditions in a hydrotreatment reactor to produce a hydrotreated effluent;

separating the hydrotreated effluent into at least a hydrotreated liquid product and a gas-phase product, the hydrotreated liquid product having a cloud point;

mixing the hydrotreated liquid product with a hydrogen-containing stream and at least a portion of the gas-phase product to produce a hydrotreated dewaxing input stream; and contacting the hydrotreated dewaxing input stream with a dewaxing catalyst under effective catalytic dewaxing conditions in a dewaxing reactor to form a dewaxed effluent that includes a dewaxed distillate product, the dewaxed effluent having a cold flow property that is at least about 5° C. or 10° C. or 20° C. or 30° C. less than a corresponding cold flow property of the feedstock, the cold flow property comprising one or more of a cloud point, a pour point, and a cold filter plugging point (of the effluent);

wherein the dewaxing catalyst comprises a framework-substituted ultra-stable Y (USY)-type zeolite in which a portion of aluminum atoms constituting a zeolite framework thereof is substituted with zirconium atoms and/or titanium and/or hafnium atoms.

Further embodiments and the full scope of applicability of the present disclosure will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

A more complete understanding of the invention and its many features and advantages will be attained by reference to the following detailed description and the accompanying drawing. It is important to note that the drawing illustrates only one embodiment of the present disclosure and therefore should not be considered to limit its scope.

DETAILED DESCRIPTION OF CERTAIN EMBODIMENTS

Figure 1:
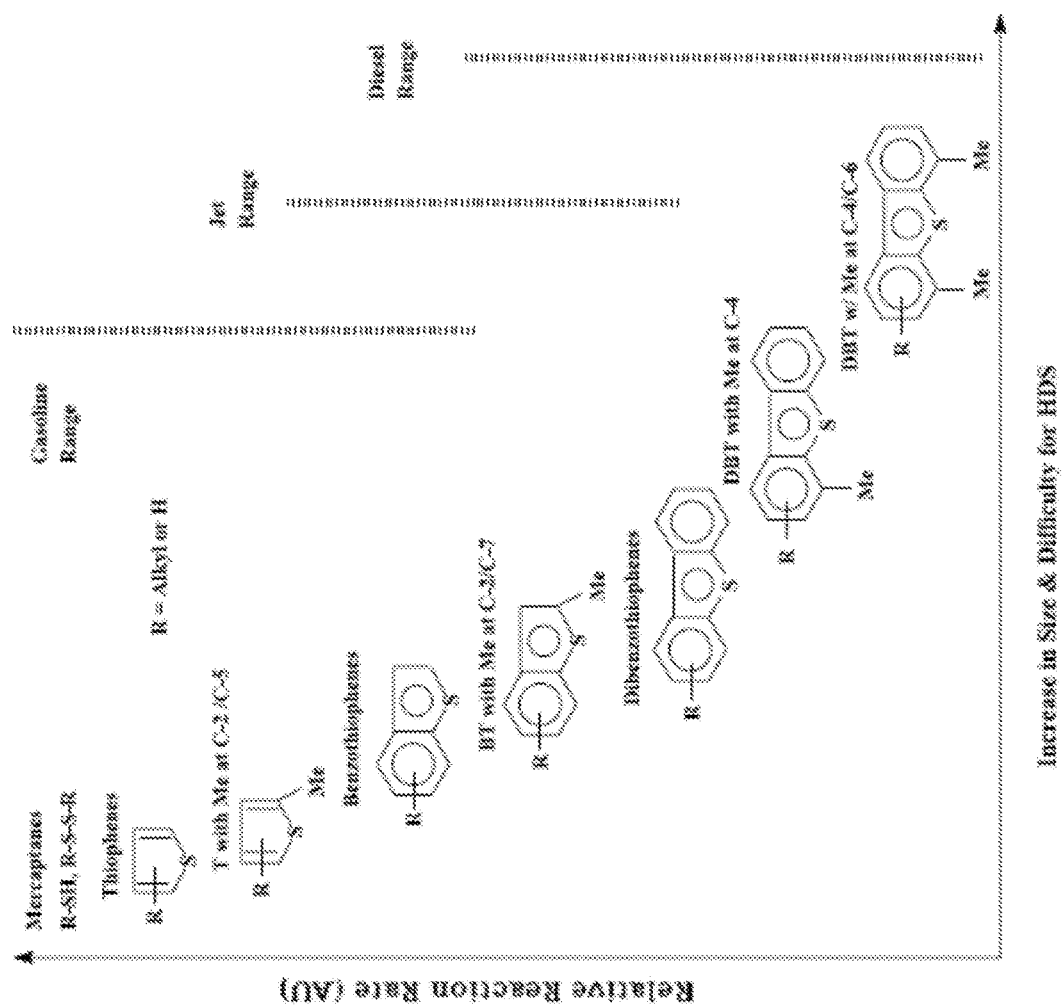
FIG. 1 sets forth the reactivity of various sulfur compounds.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

The following terms that are recited throughout the present disclosure are defined as follows:

The term "wppm", as used herein, means parts per million by weight.

The term "zeolite catalyst", as used herein, means a catalyst comprising, consisting essentially of, or consisting of a zeolite.

The term "hydroprocessing", as used herein, means any process that is carried out in the presence of hydrogen, including, but not limited to, hydrogenation, hydrotreating, hydrocracking, dewaxing, hydroisomerization, and hydrodearomatization.

The term "hydrotreating", as used herein, means a process in which a hydrocarbon feed reacts with hydrogen, in the presence of a hydrotreating catalyst, to hydrogenate olefins and/or aromatics or remove heteroatoms such as sulfur (hydrodesulfurization), nitrogen (hydrodenitrogenation, also referred to as hydrodenitrification), oxygen (hydrodeoxygenation), metals (hydrodemetallation), asphaltenes, and combinations thereof.

The term "dewaxing", as used herein, means that at least some of the normal paraffin (N-paraffin) content of a middle distillate fuel feedstock is transformed to iso-paraffin content in the presence Cloud point is an index of the lowest temperature of the utility of a petroleum product for certain applications. Cloud point was determined by ASTM Standard D2500-09 "Standard Test Method for Cloud Point of Petroleum Products", DOI: 10.1520/D2500-09.

Cold Filter Plugging Point ("CFPP") is an estimate of the highest temperature, expressed in multiples of 1° C., at which a given volume of fuel fails to pass through a standardized filtration device in a specified time when cooled under the conditions prescribed in the test method. CFPP was determined by ASTM Standard D6371-05 (2010) "Standard Test Method for Cold Filter Plugging Point of Middle distillate and Heating Fuels", DOI:10.1520/D6371-05R10.

Pour Point is an index of the lowest temperature at which movement of the test specimen is observed under prescribed conditions of test. Pour Point was determined by ASTM D97-11 "Standard Test Method for Pour Point of Petroleum Products", DOI:10.1520/D0097-11.

"LHSV" means liquid hourly space velocity, which is the volumetric rate of the liquid feed divided by the volume of the catalyst, and is given in $hr^{-1}$.

The present disclosure relates to a process for hydrotreating (hydrosulfurizing) and dewaxing of hydrocarbons (distillates), the process comprising the step of contacting a hydrotreated feedstock with a framework-substituted ultra-stable Y (USY)-type zeolite in which a portion of aluminum atoms constituting a zeolite framework thereof is substituted with zirconium atoms and/or titanium and/or hafnium atoms, thereby producing a dewaxed distillate with improved cold flow properties.

Catalyst with Framework-Substituted Ultra Stable Y (USY) Zeolite

The modified USY zeolite catalyst used in the process of the present invention is framework-substituted catalyst in which a part of aluminum atoms constituting a zeolite framework is substituted with zirconium atoms and/or hafnium atoms and/or titanium atoms.

In some embodiments, the framework-substituted zeolite used in the process of the present disclosure is an ultra-stable Y-type zeolite in which silicon atoms and aluminum atoms form a zeolite framework and in which a part of the aluminum atoms is substituted with zirconium atoms and/or titanium atoms and/or hafnium atoms. For example, framework-substituted zeolite in which a part of aluminum atoms forming a zeolite framework is substituted only with zirconium atoms is referred to as a "zirconium-substituted zeolite" or "Zr-USY"; the framework-substituted zeolite in which a part of aluminum atoms forming a zeolite framework of the framework-substituted zeolite is substituted only with hafnium atoms is referred to as a "titanium-substituted zeolite" or "Ti-USY"; and similarly, the framework-substituted zeolite in which a part of aluminum atoms forming a zeolite framework is substituted only with zirconium atoms and titanium atoms is referred to as a "zirconium titanium-substituted zeolite" or "ZrTi-USY"). In addition, the framework-substituted zeolite in the catalyst in which a part of aluminum atoms forming a zeolite framework is with zirconium atoms, titanium and hafnium atoms is referred to as "zirconium.titanium.hafnium substituted zeolite" or "Zr.Ti.Hf-USY". In other words, the framework-substituted zeolite in the catalyst of the present disclosure can be formed of any combination of Zirconium, Titanium and Hafnium atoms.

Zirconium atoms and/or titanium atoms which are substituted for the aluminum atoms forming a framework of the ultra-stable Y-type zeolite serve as constituents of the framework of the ultra-stable Y-type zeolite. Substitution can be verified by, e.g., ultraviolet, visible, and near-infrared spectrophotometry (UV-Vis-NIR), Fourier transform infrared spectroscopy (FT-IR), or nuclear magnetic resonance spectrometry (NMR).

In some embodiments, in addition to the substituted atoms, the zirconium atoms and/or titanium atoms and/or hafnium atoms may further be attached (carried) to the outside of, or combined with the framework of the USY-type catalyst, as described in U.S. Pat. No. 10,293,332, which is hereby incorporated by reference in its entirety as if fully set forth herein.

In some embodiments, the framework-substituted zeolite contains about 0.1% to about 5%, preferably about 0.2% to about 4%, more preferably about 0.3% to about 3% zirconium atoms and/or titanium by mass in terms of oxide (i.e., "$ZrO_2$," "$HfO_2$", and "$TiO_2$") based on the framework-substituted zeolite. As contemplated herein, a content range (based on oxides) of zirconium atoms and/or titanium atoms and/or hafnium atoms includes all of the contents of zirconium atoms and/or titanium atoms and/or hafnium atoms substituted for aluminum atoms forming a zeolite framework and zirconium atoms and/or titanium atoms and/or hafnium atoms which are not substituted for the above aluminum atoms.

It is appreciated by a person of skill in the art, that when the framework-substituted zeolite contains the zirconium atoms and/or the titanium atoms and/or the hafnium atoms described above, a mass ratio (in terms of oxides) of the zirconium atoms to the titanium atoms is not specifically be restricted, and any ratio of zirconium or titanium that is effective to carry out the process of the present invention may be used.

The zirconium atom and/or titanium atom and/or hafnium content of the framework-substituted zeolite can be measured with, for example, an X-ray fluorescence analyzer, a high frequency plasma emission spectrometer, an atomic absorption spectrometer or the like.

In some embodiments, particles of the zirconium and/or titanium and/or hafnium-modified USY catalyst have a diameter of 50 nm or less.

Method for Producing the Framework-Substituted Zeolite

The framework-substituted zeolite in the present invention can be produced in accordance with the methods described by U.S. Pat. No. 10,293,332, which has been previously incorporated by reference in its entirety.

The framework-substituted ultra-stable Y (USY) zeolite in the catalyst in the present invention can be produced in accordance with the methods described by U.S. Pat. No. 10,293,332. For example, the framework-substituted zeolite in the catalyst may be produced by firing a USY-type zeolite at 500° C. to 700° C., the USY-type zeolite having a crystal lattice constant of 2.430 to 2.450 nm, a specific surface area of 600 to 900 m²/g, and a molar ratio of $SiO_2$ to $Al_2O_3$ of 20 to 100, forming a suspension containing the fired USY-type zeolite, the suspension having a liquid/solid mass ratio of 5 to 15, adding an inorganic acid or an organic acid so that a pH of the above suspension is 1.0 to 2.0, subsequently adding a solution containing a zirconium compound and/or a hafnium compound and mixing them and neutralizing the solution with, for example, an aqueous ammonia in such a manner that the mixed solution has a pH of about 7.

Ultra-stable Y-type zeolite is used as one of the raw materials for preparing the framework-substituted zeolite in the catalyst. Ultra-stable Y-type zeolite means zeolite having a crystal lattice constant (UD) falling in a range of 2.430 nm or more and 2.450 nm or less, a specific surface area of 600 to 900 m²/g and a molar ratio (silica-alumina ratio) falling in a range of 20 to 100 in terms of $SiO_2$ to $Al_2O_3$. The ultra-stable Y-type zeolite may be prepared by any method known in the art.

In the method for producing the framework-modified ultra-stable Y-type zeolite, extraskeletal aluminum (aluminum atoms which do not form the zeolite framework) may be removed from the ultra-stable Y-type zeolite raw material in order to obtain the ultra-stable Y-type zeolite. Extraskeletal aluminum can be removed by, for example, a method of dispersing the ultra-stable Y-type zeolite in warm water of 40° C. to 95° C. to prepare a suspension, adding sulfuric acid to the above suspension and stirring it for 10 minutes to 3 hours while maintaining the temperature at 40° C. to 95° C. to thereby dissolve the extraskeletal aluminum. After dissolving the extraskeletal aluminum, the suspension is filtrated, and a residue on the filter is washed with purified water of 40° C. to 95° C. and dried at 100° C. to 180° C. for 3 to 30 hours, whereby an ultra-stable Y-type zeolite from which the extraskeletal aluminum is removed can be obtained.

Furthermore, in the method for producing the framework-modified ultra-stable Y-type zeolite, the ultra-stable Y-type zeolite raw material may be calcined at 500° C. to 700° C., preferably 550° C. to 650° C. The calcining time shall not specifically be restricted as long as the targeted framework-substituted zeolite is obtained, and it is calcined in a range of, for example, 30 minutes to 10 hours. In respect to a calcining atmosphere of the ultra-stable Y-type zeolite, it is carried out preferably in the air. The calcined ultra-stable Y-type zeolite is suspended in water having a temperature of about 20° C. to about 30° C. to form a suspension. With respect to the concentration of the suspension of the ultra-stable Y-type zeolite, the liquid/solid mass ratio is preferably in the range of 5 to 15, and more preferably, a mass ratio of 8 to 12 is recommended.

Next, an inorganic acid or an organic acid is added thereto so that a pH of the suspension described above is controlled to 1.0 to 2.0, and subsequently a solution containing a zirconium compound and/or a hafnium compound is added and mixed. Then, the mixed solution is neutralized (pH 7.0 to 7.5) and dried desirably at 80 to 180° C., whereby the framework-substituted zeolite described above can be obtained.

Sulfuric acid, nitric acid, hydrochloric acid and the like can be given as the above inorganic acid used, and among them, sulfuric acid, hydrochloric acid and the like are particularly preferred. Further, carboxylic acids can suitably be used as the organic acid described above. A use amount of the inorganic acid or the organic acid shall not be restricted as long as a pH of the suspension can be controlled to a range of 1.0 to 2.0, and it is, for example, a 0.5- to 4.0-fold molar amount and preferably 0.7- to 3.5-fold molar amount based on an amount of $Al_2O_3$ in the ultra-stable Y-type zeolite, but it shall not be restricted to the above range.

Examples of the zirconium compound described above include zirconium sulfate, zirconium nitrate, zirconium chloride and the like. Among these compounds, zirconium sulfate, zirconium nitrate, and the like are particularly preferred. The amount of the zirconium compound added is preferably about 0.1% to about 5% by mass and more preferably about 0.2% to about 4% by mass on a zirconium oxide basis with respect to the ultra-stable Y-type zeolite described above. Usually, an aqueous solution of a zirconium compound prepared by dissolving the zirconium compound in water is suitably used as the zirconium compound.

Examples of the hafnium compound described above include hafnium chloride, hafnium nitrate, hafnium fluoride, hafnium bromide, hafnium oxalate and the like. Among these compounds, hafnium chloride, hafnium nitrate, and the like are particularly preferred. The amount of the hafnium compound added is preferably about 0.1% to about 5% by mass and more preferably about 0.2% to about 4% by mass on a hafnium oxide basis with respect to the ultra-stable Y-type zeolite. Usually, an aqueous solution of a hafnium compound prepared by dissolving the hafnium compound in water is suitably used as the hafnium compound.

In some embodiments, a titanium compound may be added to the mixed solution described above. Examples of the titanium compound include titanium sulfate, titanium acetate, titanium chloride, titanium nitrate, and titanium lactate. Among these compounds, titanium sulfate, titanium acetate, and the like are particularly preferred. The amount of the titanium compound added is preferably about 0.1% to about 5% by mass and more preferably about 0.2% to about 4% by mass on an oxide basis with respect to the ultra-stable Y-type zeolite. Usually, an aqueous solution of a titanium compound prepared by dissolving the titanium compound in water is suitably used as the titanium compound.

A pH of the above suspension has to be controlled in advance to 1.0 to 2.0 for the purpose of preventing precipitation from being generated in mixing an aqueous solution of the zirconium compound, the hafnium compound or the titanium compound with a suspension of the ultra-stable Y-type zeolite described above.

In the case of mixing an aqueous solution of the zirconium compound, the hafnium compound or the titanium compound with a suspension of the ultra-stable Y-type zeolite, preferably, the above aqueous solution is gradually added to the suspension. After finishing addition of the aqueous solution described above to the suspension, the solution is preferably mixed by stirring at, for example, room temperature (about 25° C. to about 35° C.) for 3 to 5 hours. Further, after finishing the mixing described above, the mixed solution described above is neutralized by adding an alkali such as aqueous ammonia and the like so that a pH thereof is controlled to 7.0 to 7.5, whereby the framework-substituted zeolite in the catalyst can be obtained.

It is apparent to a person of skill in the art, that when only the zirconium compound (or an aqueous solution thereof) is used as the compound (or an aqueous solution thereof) added to the suspension described above, the framework-substituted zeolite in the catalyst (Zr-USY) in which zirconium atoms is substituted for a part of aluminum atoms forming the framework of the ultra-stable Y-type zeolite is formed; when only the hafnium compound (or an aqueous solution thereof) is used, the framework-substituted zeolite in the catalyst (Hf-USY) in which hafnium atoms is substituted for a part of aluminum atoms forming the framework of the ultra-stable Y-type zeolite is formed; when only the titanium compound (or an aqueous solution thereof) is used, the framework-substituted zeolite in the catalyst (Ti-USY) in which titanium atoms is substituted for a part of aluminum atoms forming the framework of the ultra-stable Y-type zeolite is formed; when the zirconium compound and the titanium compound (or aqueous solutions thereof) are used, the framework-substituted zeolite in the catalyst (Zr.Ti-USY) in which zirconium atoms and titanium atoms are substituted for a part of aluminum atoms forming the framework of the ultra-stable Y-type zeolite is formed; when the zirconium compound and the hafnium compound (or aqueous solutions thereof) are used, the framework-substituted zeolite in the catalyst (Zr.Hf-USY) in which zirconium atoms and hafnium atoms are substituted for a part of aluminum atoms forming the framework of the ultra-stable Y-type zeolite is formed; and when the zirconium compound, the titanium compound and the hafnium compound (or aqueous solutions thereof) are used, the framework-substituted zeolite in the catalyst (Zr.Ti.Hf-USY) in which zirconium atoms, titanium atoms and hafnium atoms are substituted for a part of aluminum atoms forming the framework of the ultra-stable Y-type zeolite is formed.

The resulting framework-substituted zeolite in the catalyst is preferably filtered, if desired, washed with water, and dried at about 80° C. to about 180° C.

The framework-modified USY zeolite may be carried on a support which contains an inorganic oxide excluding the above framework-substituted zeolite in the catalyst in addition to the framework-substituted zeolite in the catalyst described above. The inorganic oxide typically contains a substance serving as a granulating agent or a binder. Usually, a known substance that is contained in a support including the ultra-stable Y-type zeolite and that is used as a granulating agent or the like can be used. Examples of inorganic oxides include, but are not limited to alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia. In the present disclosure, in particular, an inorganic oxide mainly composed of alumina, silica-alumina is preferred.

The framework-substituted zeolite in the catalyst content and the inorganic oxide content of the support can be appropriately determined according to the object. The support has a framework-substituted zeolite in the catalyst content of about 2% to about 80% by mass, preferably about 10% to about 80% by mass, and more preferably about 20% to about 70% by mass, and an inorganic oxide content of about 98% to about 20% by mass, preferably about 90% to about 20% by mass and more preferably about 80% to about 30% by mass.

Metal Component:

The catalyst used in the process of the present disclosure may further include active metal components selected from the group consisting of IUPAC Group 7 to 11 metals of the Periodic Table. Examples of active metals include iron, cobalt, nickel, rhodium, palladium, silver, iridium, platinum or gold in group 8 of the long periodic table and/or metal components chromium, molybdenum or tungsten in group 6. Preferred examples of the metal component include combinations of molybdenum or tungsten in group 6 and cobalt or nickel in group 8; and metal components of the platinum group (platinum, rhodium, palladium and the like).

The metal component may be contained in the catalyst in an amount of about 0.01 to about 40% by mass in terms of oxide. In the case of molybdenum, tungsten, cobalt or nickel, an amount thereof is particularly preferably about 3 to about 30% by mass in terms of oxide based on a mass of the catalyst. In the case of the platinum group (platinum, rhodium, palladium and the like), an amount thereof is particularly preferably about 0.01 to about 2% by mass in terms of metal.

System/Process Parameters for Hydrotreating and Dewaxing of Hydrocarbon Distillate Streams As discussed herein, the present disclosure relates to distillate hydrotreating units (reactors), such as diesel hydrotreating units, and in particular, to catalysts used therein. As is known, a distillate hydrotreater can be generally described as a category of hydrotreaters that treats distillate streams from atmospheric distillation and from conversion units to reduce their sulfur content and to improve their properties for blending into diesel. Thus, the purpose of the hydrotreater unit is primarily to remove sulfur and other contaminants from intermediate streams before blending into a finished refined product or before being fed into another refinery process unit. Hydrotreaters work generally in the following manner A hydrocarbon is mixed with hydrogen and heated to an elevated temperature, such as 250-430° C. The mixture is injected into a reactor vessel filled with a catalyst. In the presence of the catalyst and heat, the hydrogen reacts with the hydrocarbon, removing sulfur (to form $H_2S$), removing nitrogen (to form ammonia), and saturating olefins and aromatics with hydrogen. Typically, there is also a small amount of hydrocarbon cracking to form methane, ethane, propane and butane.

Dewaxing

As discussed herein, most lubricating oil feedstocks must be dewaxed in order to manufacture finished products which will remain fluid down to the lowest temperature of use. Dewaxing is the process of separating or converting hydrocarbons which solidify readily (e.g., waxes) in petroleum fractions. Processes for dewaxing petroleum distillates have been known for some time. As used herein, dewaxing means a reduction in at least some of the normal paraffin content of the feed. The reduction may be accomplished by isomerization of n-paraffins and/or cracking, or hydrocracking. Dewaxing is required when highly paraffinic oils are to be used in products which need to flow at low temperatures, i.e., lubricating oils, heating oil, diesel fuel, and jet fuel. These oils contain high molecular weight straight chain and slightly branched paraffins which cause the oils to have high pour points and cloud points and, for jet fuels, high freeze points. In order to obtain adequately low pour points, these waxes must be wholly or partly removed or converted. In the past, various solvent removal techniques were used, such as MEK (methyl ethyl ketone-toluene solvent) dewaxing, which utilizes solvent dilution, followed by chilling to crystallize the wax, and filtration.

Exemplary Reaction (Reactor) System

Figure 2:
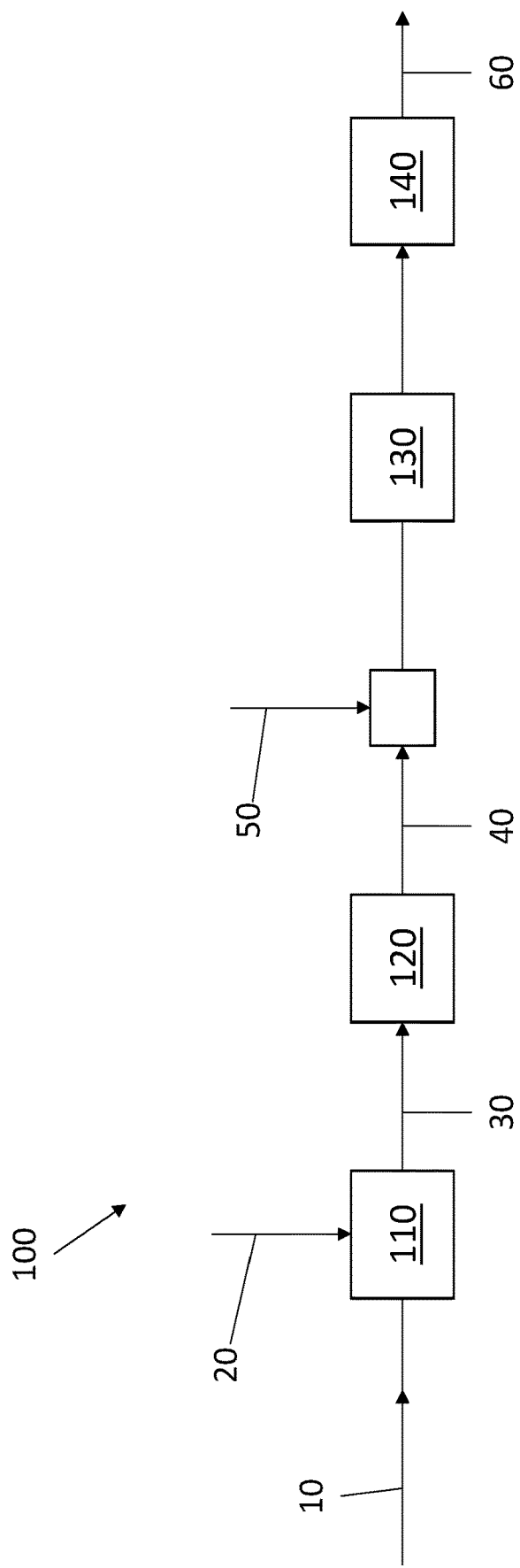
FIG. 2 is a schematic illustrating one exemplary system and process for improving cold flow properties of distillates using zirconium and/or titanium and/or hafnium-modified ultra-stable Y (USY) type zeolite catalysts.

A reaction system 100 suitable for carrying out the processes discussed herein is shown schematically in FIG. 2. In FIG. 2, a hydrocarbon feedstock 10 is introduced into a first hydrotreatment reactor 110. A hydrogen treat gas stream 20 is also introduced into hydrotreatment reactor 110. It will be appreciated that the hydrogen treat gas stream 20 can include a portion of recycled hydrogen gas stream that is generated downstream in the process. The hydrocarbon feedstock is exposed to hydrotreating conditions in first hydrotreatment reactor 110 in the presence of one or more catalyst beds that contain hydrotreating catalyst. The hydrotreatment process performed in the first hydrotreatment reactor 110 reduces the sulfur content of the treated feedstock.

The system 100 can optionally include a separation stage 120. When the separation stage 120 is present, the hydrotreated feedstock 30 flows from the first hydrotreatment reactor 110 into a separation stage 120, where gas phase products are separated from liquid phase products. Separation stage 120 is shown as a single device or stage; however, it will be appreciated that this separation stage 120 can represent multiple devices that perform the function of a separation stage. In the embodiment shown in FIG. 2, the separation stage 120 produces a hydrotreated liquid stream 30 and can also optionally produce a gaseous slip stream, and a gaseous stream for recycling (not shown in the figure). The stream for recycling can be passed to a purification stage and resulting stream (output) can be added to a hydrogen loop of the refiner or this output can be used as part of the hydrogen for first hydrotreatment reactor 110 as understood by one skilled in the art. However, it will be understood that the dewaxing step can be accomplished in a single stage by placing the appropriate catalyst in the bottom of the reactor.

The hydrotreated feedstock from the first hydrotreatment reactor 110, or the hydrotreated liquid stream 40 from the separation stage 120 when the separation stage 120 is present, is then passed to a dewaxing stage including a dewaxing reactor 140, such as a liquid-continuous dewaxing reactor. Prior to entering dewaxing reactor 140, the hydrotreated liquid stream 40 can be saturated or partially saturated with hydrogen. This can be accomplished, for example, by adding a hydrogen stream 50 to hydrotreated liquid stream 40 and then mixing the streams in static mixer 130 or the like.

After mixing to generate a saturated or partially saturated hydrotreated liquid stream 40, the hydrotreated liquid stream 40 enters dewaxing reactor 140. The liquid-continuous dewaxing reactor 140 dewaxes the feed and generates a diesel product stream 60.

Hydrocarbon Feed 10

The hydrocarbon feed used in the process of the invention may be any hydrocarbon feed that is suitable for use in the present system. For example, the hydrocarbon feed can be a mineral hydrocarbon feedstock or can be gas oils produced by the distillation of crude oil at approximately atmospheric pressure.

As is typically known, a mineral hydrocarbon feedstock refers to a hydrocarbon feedstock derived from crude oil that has optionally been subjected to one or more separation and/or other refining processes. Mineral hydrocarbon feedstocks can include petroleum feedstocks boiling in the diesel range or at higher temperatures. Additionally, or alternately, suitable feedstocks can include gas oils produced by the distillation of crude oil at approximately atmospheric pressure. A crude oil distillation tower can generally produce several grades of atmospheric gas oils. Other examples of mineral hydrocarbon feedstocks can include, but are not limited to, vacuum gas oils, demetallized oils, coker distillates, cat cracker distillates, jet fuel boiling range distillate fraction, kerosene boiling range distillate fraction, coal liquids, and combinations thereof.

In one exemplary embodiment, the hydrocarbon feedstock can have an initial boiling point of at least about 115° C., for example at least about 140° C. or at least about 170° C. Further, a feed can be characterized based on the portion of the feed that boils at a temperature and/or based on measurable properties such as cold flow properties (e.g., cloud point).s For instance, a T5 boiling point can be defined as the temperature at which 5% of the feed will boil. Thus, when the feedstock is characterized based on boiling point range, the feedstock can additionally or alternately have a T5 boiling point of at least about 150° C., for example at least about 175° C. or at least about 190° C. Further additionally or alternately, the feedstock can have a final boiling point of about 440° C. or less, and in particular, for distillates the final boiling point can be about 375° C. or less. Still further additionally or alternately, the feedstock can have a T95 boiling point of about 440° C. or less, for example about 425° C. or less or about 400° C. or less. When the feed is characterized based on cloud point, the cloud point of the feedstock can additionally or alternately be about 10° C. or less, for example about 4° C. or less, about −4° C. or less, or about −12° C. or less. Further additionally or alternately, the cloud point of the feedstock can be at least about −15° C., for example at least about −9° C., at least about −4° C., at least about 0° C., or at least about 4° C.

It will be understood that the aforementioned values are only exemplary in nature and not limiting of the present system 100 and in particular, not limiting of the types of hydrocarbon feedstocks that can be used with system 100.

The mineral feedstock can contain nitrogen-containing compounds (abbreviated as "nitrogen" or "nitrogen content") and typically also sulfur-containing compounds (abbreviated as "sulfur" or "sulfur content"). In general, a majority of the nitrogen can be in the form of organonitrogen compounds. Additionally, or alternately, at least a majority of the sulfur can be in the form of organosulfur compounds. In one embodiment, the mineral feedstreams (feedstocks) suitable can have a nitrogen content from about 50 wppm to about 6000 wppm, preferably from about 50 wppm to about 2000 wppm, from about 50 wppm to about 1500 wppm, or from about 75 wppm to about 1000 wppm. Additionally or alternately, mineral feedstreams suitable for use herein can have a sulfur content from about 100 wppm to about 40,000 wppm, for example from about 100 wppm to about 30,000 wppm or from about 200 wppm to about 20,000 wppm, preferably from about 200 wppm to about 10,000 wppm, from about 200 wppm to about 5000 wppm, or from about 350 wppm to about 2500 wppm sulfur.

It will be understood that the aforementioned values are only exemplary in nature and not limiting of the present system 100 and in particular, not limiting of the types of hydrocarbon feedstocks that can be used with system 100.

In certain embodiments, the hydrocarbon feed can additionally or alternately include feeds from biocomponent sources.

In one embodiment, the hydrocarbon feedstock comprises a hydrocarbon oil that has a boiling point range of between about 150° C. and about 400° C.

The Examples set forth below set forth sample feedstocks suitable for use in the disclosed system and process. However, as mentioned herein, there are many different hydrocarbon based feedstocks that can be used as part of a distillation process that produces distillates. As described herein, in one embodiment, an exemplary feedstock is on which is suitable to produce diesel fuels as a result of a distillation process.

Hydrotreating Stage 110

As discussed herein, the hydrocarbon feedstock 10 is introduced into the first hydrotreatment reactor 110 and more particularly, the hydrocarbon feedstock 10 can be hydrotreated in one or more hydrotreating stages and/or reactors 110. A hydrotreatment stage can be in any suitable type of hydrotreatment reactor, such as a trickle-bed reactor or another type of reactor that can include a continuous gas phase. A hydrotreatment stage can involve exposing the feedstock to a suitable hydrotreating catalyst in the presence of hydrogen under hydrotreating conditions using conventional techniques.

As will be appreciated, any number of hydrotreating catalysts can be used so long as they are suitable for the intended application. For example, the hydrotreatment catalyst can contain at least one of Group VIB and/or Group VIII metals, optionally on a support. Examples of suitable (optional) support materials can include alumina, silica, titania, zirconia, silica-alumina, combinations thereof, or any other suitable refractory material. Examples of Group VIB metals can include molybdenum and/or tungsten. Examples of Group VIII materials can include nickel, cobalt, and/or iron.

The hydrotreating conditions are those suitable conditions and can include one or more of: a temperature from about 260° C. to about 425° C., for example from about 300° C. to about 400° C.; a total pressure of at least about 20 Kg/cm$^2$, for example at least about 30 Kg/cm$^2$ or at least about 40 Kg/cm$^2$; a total pressure of about 200 Kg/cm$^2$ or less, for example about 100 Kg/cm$^2$ or less, or about 60 Kg/cm$^2$ or less; a liquid hourly space velocity (LHSV) of at least about 0.1 hr$^{-1}$, for example at least about 0.2 hr$^{-1}$, at least about 0.4 hr$^{-1}$, or at least about 0.5 hr$^{-1}$; an LHSV of about 15 hr$^{-1}$ or less, for example about 10 hr$^{-1}$ or less, about 5 hr$^{-1}$ or less, about 2 hr$^{-1}$ or less, about 1.5 hr$^{-1}$ or less, or about 1.2 hr$^{-1}$ or less (note that the LHSV refers to the space velocity relative to catalyst for the hydrotreating stage(s), and therefore does not reflect the catalyst volume of any subsequent stage such as a dewaxing stage); a hydrogen treat gas rate of at least about 85 Nm$^3$/m$^3$, for example at least about 170 Nm$^3$/m$^3$; and a hydrogen treat gas rate of about 1700 Nm$^3$/m$^3$ or less, for example about 850 Nm$^3$/m$^3$ or less.

It will be understood that the aforementioned values are only exemplary in nature and not limiting of the present system 100 and in particular, not limiting of the hydrotreating conditions suitable for the reactor 110.

During hydrotreatment, the sulfur and nitrogen contents of the feedstock can preferably be reduced. With regard to sulfur, one or more hydrotreatment stages can advantageously reduce the sulfur content to a suitable level, such to about 1000 wppm or less, for example about 500 wppm or less, about 50 wppm or less, about 30 wppm or less, about 20 wppm or less, about 15 wppm or less, or about 10 wppm or less. With regard to nitrogen, the hydrotreating stage(s) can additionally or alternately reduce the nitrogen content of the feed to about 100 wppm or less, for example about 50 wppm or less, about 20 wppm or less, about 15 wppm or less, about 10 wppm or less, or about 5 wppm or less. Hydrotreatment can additionally or alternately be used to deoxygenate (e.g., substantially deoxygenate, which can correspond to removing at least 90 mol %, for example at least 95 mol %, at least 98 mol %, or at least 99 mol % of the oxygen present, and/or which can correspond to reducing the oxygenate level to 0.1 wt % or less, for example 0.05 wt % or less, 0.01 wt % or less, or 0.005 wt % or less) the biocomponent or other oxygen-containing feedstock. Deoxygenating a feed can avoid problems with catalyst poisoning and/or deactivation due to the creation of water or carbon oxides during hydroprocessing.

Optional Separation Stage 120

As mentioned herein, the system 100 can include an optional separation stage 120. After hydrotreatment, a separation device can be used to separate out impurities prior to passing the hydrotreated feedstock to the dewaxing stage. The separation device can be a separator, a stripper, a fractionator, or another device, or another combination of devices suitable for separating gas-phase products from liquid-phase products. For example, a separator stage can be used to remove various contaminants, such as $H_2S$ and $NH_3$, formed during hydrotreatment, as well as other gas phase species such as $H_2$ or any low boiling products. The separator stage can be a hot or cold separation stage, or a combination of hot and cold separation. The separation stage can operate at a pressure similar to the prior hydroprocessing stage, which can be referred to as a high pressure separation stage, or the pressure can be allowed to drop across the separation stage. It will further be appreciated that any number of other separation devices can be used so long as they are suitable for the intended application. In addition, the separation stage can be configured to allow both for recycling of hydrogen and for providing a liquid product stream for use in the dewaxing stage(s).

Catalytic Dewaxing Stage 140

As mentioned herein, any number of suitable catalytic dewaxing reactors can be used in the system 100 so long as they are suitable for the intended application. For example, the catalytic dewaxing reactor 140 can be in the form of a trickle-bed reactor of a liquid-continuous reactor. More particularly, one option for hydroprocessing a feedstock can be to conduct the reactions in a reactor in which the liquid phase represents the continuous phase in the reactor. Traditionally, hydroprocessing has been conducted in trickle-bed reactors where an excess of gas results in a continuous gas phase in the reactor. In a liquid-continuous reactor, the feedstock can be exposed to one or more beds of catalyst. The reactor can contain a dewaxing catalyst, which can be used alone or in conjunction with other types of catalysts, such as those suitable for hydrotreating (e.g., hydrodenitrogenation, hydrodeoxygenation, and/or hydrodesulfurization) and/or hydrocracking. The liquid can enter from the top or upper portions of the reactor and can flow downward through the reactor. This downward liquid flow can assist in allowing the catalyst to remain in place in the catalyst bed.

Catalytic dewaxing can be performed by exposing a feedstock to a dewaxing catalyst under effective (catalytic) dewaxing conditions. Effective dewaxing conditions can include a temperature of at least about 260° C., or at least about 288° C., or at least about 316° C., or at least about 343° C. Alternatively, the temperature can be about 399° C. or less, or about 371° C. or less, or about 343° C. or less. The pressure can be at least about 14 $Kg/cm^2$, or at least about 35 $Kg/cm^2$, or at least about 53 $Kg/cm^2$, or at least about 70 $Kg/cm^2$. Alternatively, the pressure can be about 105 $Kg/cm^2$ or less, or about 85 $Kg/cm^2$ or less, or about 70 $Kg/cm^2$ or less, or about 56 $Kg/cm^2$ or less. The Liquid Hourly Space Velocity (LHSV) can be at least about 0.5 $hr^{-1}$, or at least about 1.0 $hr^{-1}$, or at least about 1.5 $hr^{-1}$. Alternatively, the LHSV can be about 5.0 $hr^{-1}$ or less, or about 3.0 $hr^{-1}$ or less, or about 2.0 $hr^{-1}$ or less. The treat gas rate can be at least about 500 scf/bbl (84 $m^3/m^3$), at least about 750 scf/bbl (126 $m^3/m^3$), or at least about 1000 scf/bbl (169 $m^3/m^3$). Alternatively, the treat gas rate can be about 4000 scf/bbl (674 $m^3/m^3$) or less, or about 2000 scf/bbl (337 $m^3/m^3$) or less, or about 1500 scf/bbl (253 $m^3/m^3$) or less, or about 1250 scf/bbl (21 1 $m^3/m^3$) or less.

It will be understood that the aforementioned values are only exemplary in nature and not limiting of the present system 100 and in particular, not limiting of the catalytic dewaxing conditions suitable for the stage 140.

Based on dewaxing under effective catalytic dewaxing conditions, the cloud point of a dewaxed distillate fuel fraction can be reduced relative to the feedstock by at least about 5° C., such as at least about 11° C., or at least about 17° C., or at least about 20° C. Additionally or alternately, in an aspect where the feedstock is hydrotreated prior to dewaxing, the cloud point of a dewaxed distillate fuel fraction can be reduced relative to the hydrotreated effluent by at least about 5° C., such as at least about 11° C., or at least about 17° C. The amount of cloud point reduction can depend on a variety of factors, including the sulfur content of the feedstock, the nitrogen content of the feedstock, and the selected effective dewaxing conditions.

Once again, the aforementioned values are only exemplary in nature and not limiting of the present system; however, they are listed to show the desirable results that are obtained by using the disclosed to hydrotreat and dewax one or more distillates, such as a hydrocarbon oil.

It will be understood that the disclosed process is at least in part directed to the use of the disclosed dewaxing catalyst in a hydrotreatment and dewaxing process and therefore, any number of different hydrocarbon feedstocks can be used, including hydrocarbon oils, and the disclosed catalyst and processes allow for the processing of distillates with high final boiling point to obtain distillates that meet the stricter specifications that are now in place.

EXAMPLES

The following examples are provided to better illustrate embodiments of the present disclosure. However, it is to be understood that these examples are merely illustrative in nature, and that the process embodiments of the present disclosure are not necessarily limited thereto.

Example 1: Materials and Methods

A hydrocarbon oil, the properties which are shown in Table 1, was used as a feedstock to demonstrate the improved cold flow properties of distillates using the catalysts described herein. The experiments were conducted in a pilot plant test conducted over 29 days. The solid catalyst, described below, was added to the dewaxing reactor.

TABLE 3

Feedstock properties

| Feed number | Units | Value |
|---|---|---|
| Feedstock Description | Hydrocarbon oil | |
| Density @ 15° C. | Kg/L | 0.84 |
| Sulfur | W % | 1.42 |
| Nitrogen | ppmw | 73 |
| DISTILLATION SIMDIST* (D2887) | | |
| Initial boiling point (IBP) | ° C. | 91 |
| 10 W % (Off) | ° C. | 187 |
| 30 W % | ° C. | 253 |
| 50 W % | ° C. | 293 |
| 70 W % | ° C. | 331 |
| 90 W % | ° C. | 381 |
| Final boiling point (FBP) | ° C. | 441 |

*SimDist (D2887) is a Simulated Distillation System for ASTM D2887, designed to determine the boiling range distribution of petroleum product.
The W % listed as part of the distillation process indicate that amount (in W %) of the feedstock that has been distilled off.

The Pilot Plant Test Conditions (Dewaxing Stages) are Summarized Below:
Catalyst: Ni—Mo/Silica-Alumina/Zeolite (the zeolite used was a Ti—Zr inserted USY zeolite of the type described herein (it will be understood that Hf substituted USY zeolite can be used as described herein).
Temperature: 300° C., 310° C., 320° C., 330° C., 340° C., 350° C., 360° C., 380° C., 400° C. (These are the temperatures that the sample is heated to during the distillation process and more particularly, these values represent the reaction temperatures in the reactor. The pilot reactor was operated at each temperature for a period of time (e.g., 3 days).
For example, the test was started at 300° C. and then the temperature was increased at 10° C. increments to determine the temperature impact on the dewaxing process).
LHSV: 0.70 h-1
H2/Oil ratio: 300 SLt/Lt
Hydrogen partial pressure: 46 Kg/cm$^2$.
Results:

The feedstock's (initial) cloud point is −9° C. and the feedstock's pour point is −10° C. The cloud and pour points of the products, which were estimated from the specific gravities and distillation curves showed significant decrease at an operating temperature of 350° C. and higher. For example, the maximum improvement was 24° C. and a distillate with cloud point of −33° C. being obtained. The improvements in pour point of the distillate was 29° C. reaching −39° C. while the distillation 95 W % point described by as high as 45° C.

Example 2: Materials and Methods

A pilot plant test was conducted over 25 days using the feedstock shown in Table 3. The conditions are summarized below:
Catalyst: Co—Mo/Zeolite/Al
Temperature: 300° C., 310° C., 320° C., 330° C., 340° C., 350° C., 360° C., 380° C., 400° C. (these are the temperatures that the sample is heated to during the distillation process)
LHSV: 0.95 h-1
H2/Oil ratio: 300 SLt/Lt
Hydrogen partial pressure: 46 Kg/cm$^2$.

The feedstock's cloud point was −9° C. and the feedstock's pour point is −10° C. The cloud and pour points of the products, which were estimated from the specific gravities and distillation curves, showed significant decrease at an operating temperature of 350° C. and higher. For example, the maximum improvement was 16° C. and a distillate with a cloud point of −26° C. was obtained. The improvement in pour point of the distillate was 18° C., reaching −28° C., while the distillation 95 W % point decreased by as high as 28° C.

The present disclosure thus sets forth catalysts and processes for improving cold flow properties of distillates using zirconium and/or titanium and/or hafnium-modified ultrastable Y (USY) type zeolite catalysts.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for improving cold flow properties of distillates, the process comprising the step of contacting a hydrocarbon feedstock with a framework-substituted ultra-stable Y (USY)-type zeolite catalyst in which a portion of aluminum atoms constituting a zeolite framework thereof is substituted with zirconium atoms and/or titanium atoms and/or hafnium atoms, thereby producing a dewaxed distillate product having improved cold flow properties,
wherein the hydrocarbon feedstock has a boiling point range of 150° C. to 350° C.

2. The process of claim 1, wherein the dewaxed distillate product has a cold flow property that is less than a corresponding cold flow property of the hydrocarbon feedstock, the cold flow property comprising one or more of a cloud point, a pour point, and a cold filter plugging point.

3. The process of claim 2, wherein the cold flow property of the dewaxed distillate product is at least about 5° C. less than a corresponding cold flow property of the hydrocarbon feedstock.

4. The process according to claim 2, wherein the cold flow property of the dewaxed distillate product comprises cloud point and is at least about 5° C. less than a corresponding cold point of the hydrocarbon feedstock.

5. The process according to claim 2, wherein the cold flow property of the dewaxed distillate product comprises pour point and is at least about 5° C. less than a corresponding pour point of the hydrocarbon feedstock.

6. The process according to claim 2, wherein the cold flow property of the dewaxed distillate product comprises filter plugging point and is at least about 5° C. less than a corresponding filter plugging point of the hydrocarbon feedstock.

7. The process according to claim 1, wherein the framework-substituted USY-type zeolite catalyst comprises from about 0.1 to about 5% by mass zirconium and/or titanium atoms and/or hafnium atoms, calculated as the oxide basis.

8. The process according to claim 1, wherein the framework-substituted USY-type zeolite in the catalyst further includes a support comprising inorganic oxides selected from the group consisting of alumina, silica-alumina and combinations thereof.

9. The process according to claim 1, wherein the hydrocarbon feedstock and the framework-substituted USY-type zeolite catalyst are contacted in at least one dewaxing stage, which is operated at reaction temperature range of about 300° C. to about 420° C., a pressure of about 20 to about 90 Kg/cm2 and a liquid hourly space velocity (LHSV) of about 0.5 to about 5 h-1 and a hydrogen to hydrocarbon ratio of about 100 SLt/Lt to about 500 SLt/Lt.

10. The process according to claim 1, wherein the framework-substituted USY-type zeolite catalyst contains amorphous silica-alumina as a dewaxing component.

11. The process according to claim 1, wherein the framework-substituted USY-type zeolite catalyst contains alumina as a binder.

12. The process according to claim 1, wherein the dewaxed distillate product contains less than about 500 ppm sulfur.

13. The process according to claim 1, wherein the dewaxed distillate product contains less than about 100 ppm nitrogen.

14. The process according to claim 1, wherein the dewaxed distillate product comprises a diesel fuel.

15. A process for making a diesel fuel product, comprising the steps of:
contacting a hydrocarbon feedstock with a hydrotreating catalyst under effective hydrotreating conditions in a hydrotreatment reactor to produce a hydrotreated effluent, wherein the hydrocarbon feedstock has a boiling point range of 150° C. to 350° C.;
separating the hydrotreated effluent into at least a hydrotreated liquid product and a gas-phase product, the hydrotreated liquid product having a cloud point;
mixing the hydrotreated liquid product with a hydrogen-containing stream and at least a portion of the gas-phase product to produce a hydrotreated dewaxing input stream; and
contacting the hydrotreated dewaxing input stream with a dewaxing catalyst under effective catalytic dewaxing conditions in a dewaxing reactor to form a dewaxed effluent that includes a dewaxed distillate product, the dewaxed effluent having a cold flow property that is at least about 5° C. less than a corresponding cold flow property of the feedstock, the cold flow property comprising one or more of a cloud point, a pour point, and a cold filter plugging point;
wherein the dewaxing catalyst comprises a framework-substituted ultra-stable Y (USY)-type zeolite in which a portion of aluminum atoms constituting a zeolite framework thereof is substituted with zirconium atoms and/or titanium atoms and/or hafnium.

16. The process of claim 15, wherein the hydrotreating catalyst is free of any zeolite.

17. The process of claim 15, wherein the framework-substituted USY-type comprises from about 0.1 to about 5% by mass zirconium and/or titanium atoms and/or hafnium atoms, each calculated as the oxide basis.

18. The process according to claim 15, wherein the framework-substituted USY-type zeolite in the catalyst further includes a support comprising inorganic oxides selected from the group consisting of alumina, silica-alumina and combinations thereof.

19. The process according to claim 15, wherein the effective catalytic dewaxing conditions comprise a reaction temperature range of about 300° C. to about 420° C., a pressure of about 20 to about 90 Kg/cm2 bars and a liquid hourly space velocity (LHSV) of about 0.5 to about 5 h-1 and a hydrogen to hydrocarbon ratio of about 100 SLt/Lt to about 500 SLt/Lt.

20. The process according to claim 15, wherein the cold flow property of the dewaxed effluent is at least about 10° C. less than the corresponding cold flow property of the feedstock.

21. The process according to claim 15, wherein the cold flow property of the dewaxed effluent is at least about 20° C. less than the corresponding cold flow property of the feedstock.

22. The process according to claim 15, wherein the cold flow property of the dewaxed effluent is at least about 30° C. less than the corresponding cold flow property of the feedstock.

* * * * *